United States Patent
Sumita et al.

(10) Patent No.: US 10,658,960 B2
(45) Date of Patent: May 19, 2020

(54) MOTOR CONTROL SYSTEM AND MOTOR CONTROL METHOD

(71) Applicant: Hitachi, Ltd., Chiyoda-ku, Tokyo (JP)

(72) Inventors: Satoshi Sumita, Tokyo (JP); Yoshitaka Iwaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/327,607

(22) PCT Filed: Sep. 21, 2016

(86) PCT No.: PCT/JP2016/077814
§ 371 (c)(1),
(2) Date: Feb. 22, 2019

(87) PCT Pub. No.: WO2018/055691
PCT Pub. Date: Mar. 29, 2018

(65) Prior Publication Data
US 2019/0207544 A1 Jul. 4, 2019

(51) Int. Cl.
*H02P 21/22* (2016.01)
*H02P 27/12* (2006.01)
(Continued)

(52) U.S. Cl.
CPC ............. *H02P 21/13* (2013.01); *B65H 54/02* (2013.01); *B66B 1/308* (2013.01); *F04B 35/04* (2013.01);
(Continued)

(58) Field of Classification Search
None
See application file for complete search history.

(56) References Cited

U.S. PATENT DOCUMENTS 5,710,498 A * 1/1998 Yutkowitz .............. G05B 19/19
318/568.22
6,300,865 B1 * 10/2001 Fechner ................ G01S 13/931
340/436
(Continued)

FOREIGN PATENT DOCUMENTS

| JP | 2006-180605 A | 7/2006 |
| JP | 2015-76942 A | 4/2015 |
| JP | 5968572 B1 | 8/2016 |

OTHER PUBLICATIONS

International Search Report (PCT/ISA/210) issued in PCT Application No. PCT/JP2016/077814 dated Dec. 20, 2016 with English translation (three pages).
(Continued)

*Primary Examiner* — Bentsu Ro
(74) *Attorney, Agent, or Firm* — Crowell & Moring LLP (57) ABSTRACT

Disclosed are a motor control system and a motor control method that allow the balance of evaluation values in a trade-off relationship to be easily adjusted. The motor control system includes: an inverter (5) that applies AC voltage to a motor (1); a control unit (3, 4) that generates a voltage command for AC voltage in response to a control command; and a feedback unit (6, 7, 8) that applies a correction value to the control unit. The feedback unit estimates a plurality of evaluation values from a state quantity using a plurality of regression formulas, where at least one state quantity (x1, x2) of the motor is an input variable and a plurality of evaluation values (y1, y2) of the motor or a motor-driven object (2) are output variables, calculates an evaluation function with the estimated plurality of evaluation values as arguments, and generates a correction command on the basis of a calculation value resulting from the evaluation function.

14 Claims, 9 Drawing Sheets

(51) Int. Cl.
  *H02P 21/13*   (2006.01)
  *B65H 54/02*   (2006.01)
  *B66B 1/30*    (2006.01)
  *F04B 35/04*   (2006.01)
  *H02P 27/06*   (2006.01)
  *H02P 23/14*   (2006.01)

(52) U.S. Cl.
  CPC .............. *H02P 21/22* (2016.02); *H02P 23/14* (2013.01); *H02P 27/06* (2013.01); *H02P 27/12* (2013.01)

(56) References Cited

U.S. PATENT DOCUMENTS

2013/0342142 A1* 12/2013 Marcinkiewicz .. B60H 1/00428
                                                   318/400.11
2014/0084822 A1*  3/2014 Ito ......................... H02P 6/185
                                                   318/400.02
2015/0097509 A1   4/2015 Hisano et al.
2016/0378077 A1* 12/2016 Iijima ................ G05B 13/0265
                                                   318/561
2017/0199510 A1   7/2017 Fujita et al.

OTHER PUBLICATIONS

Japanese-language Written Opinion (PCT/ISA/237) issued in PCT Application No. PCT/JP2016/077814 dated Dec. 20, 2016 (three pages).

* cited by examiner

MOTOR CONTROL SYSTEM AND MOTOR CONTROL METHOD

TECHNICAL FIELD

The present invention relates to a motor control system and a motor control method for controlling the driving of a motor.

BACKGROUND ART

A motor control system for controlling the driving of a motor is widely applied in the fields of, for example, fans, pumps, compressors, automobiles, and railroads, in which electric power is used after being converted into mechanical output. In the motor control system, there is a trade-off relationship between a plurality of evaluation values. In order to optimize a trade-off balance, it is necessary to adjust control parameters. This complicates control design.

For example, the technique described in PTL 1 is known as a conventional technique relating to a trade-off balance between evaluation values. This technique involves a limiter that limits a current component for compensating a pulsation component in torque control for extracting the pulsation component generated by a compressor as a load and for compensating it. As a result, it is possible to prevent an increase in input power while also reducing pulsation.

CITATION LIST

Patent Literature

PTL 1: JP 2006-180605 A

SUMMARY OF INVENTION

Technical Problem

In the above-described conventional technique, it is necessary to adjust the limiter according to a motor control system and a load. It is thus difficult to achieve a desired trade-off adjustment and to perform an optimum trade-off adjustment.

Therefore, the present invention provides a motor control system and a motor control method that allow a balance of evaluation values in a trade-off relationship to be easily adjusted.

Solution to Problem

In order to solve the above-described problems, a motor control system according to the present invention includes: an inverter that applies AC voltage to a motor; a control unit that generates a voltage command for the AC voltage in response to a control command; and a feedback unit that gives, to the control unit, a correction command for changing the voltage command, wherein the feedback unit: estimates a plurality of evaluation values of the motor or an object to be driven by the motor from at least one state quantity of the motor by using a plurality of regression formulas, in which the state quantity is an input variable and the plurality of evaluation values are output variables; calculates an evaluation function with the estimated plurality of evaluation values as arguments; and generates the correction command based on a calculation value resulting from the evaluation function.

Furthermore, in order to solve the above-described problems, a motor control method according to the present invention is a motor control method for applying AC voltage to a motor in response to a voltage command, the method including: estimating a plurality of evaluation values of the motor or an object to be driven by the motor from at least one state quantity of the motor by using a plurality of regression formulas, in which the state quantity is an input variable and the plurality of evaluation values are output variables; calculating an evaluation function with the estimated plurality of evaluation values as arguments; and changing the voltage command based on a calculation value resulting from the evaluation function.

Advantageous Effects of Invention

According to the present invention, evaluation values are estimated by regression formulas, and a voltage command is changed based on a calculation value resulting from an evaluation function with the estimated evaluation values as arguments. Thus, it is possible to easily adjust a balance of a plurality of evaluation values in a trade-off relationship.

Objects, configurations, and effects other than those described above will be clarified in the following description of embodiments.

DESCRIPTION OF EMBODIMENTS

Embodiments of the present invention will be described below on the basis of first to fourth embodiments with reference to the drawings.

It should be noted that in each of the drawings, those denoted by the same reference numerals indicate the same constituent elements or constituent elements having similar functions.

First Embodiment

Figure 1:
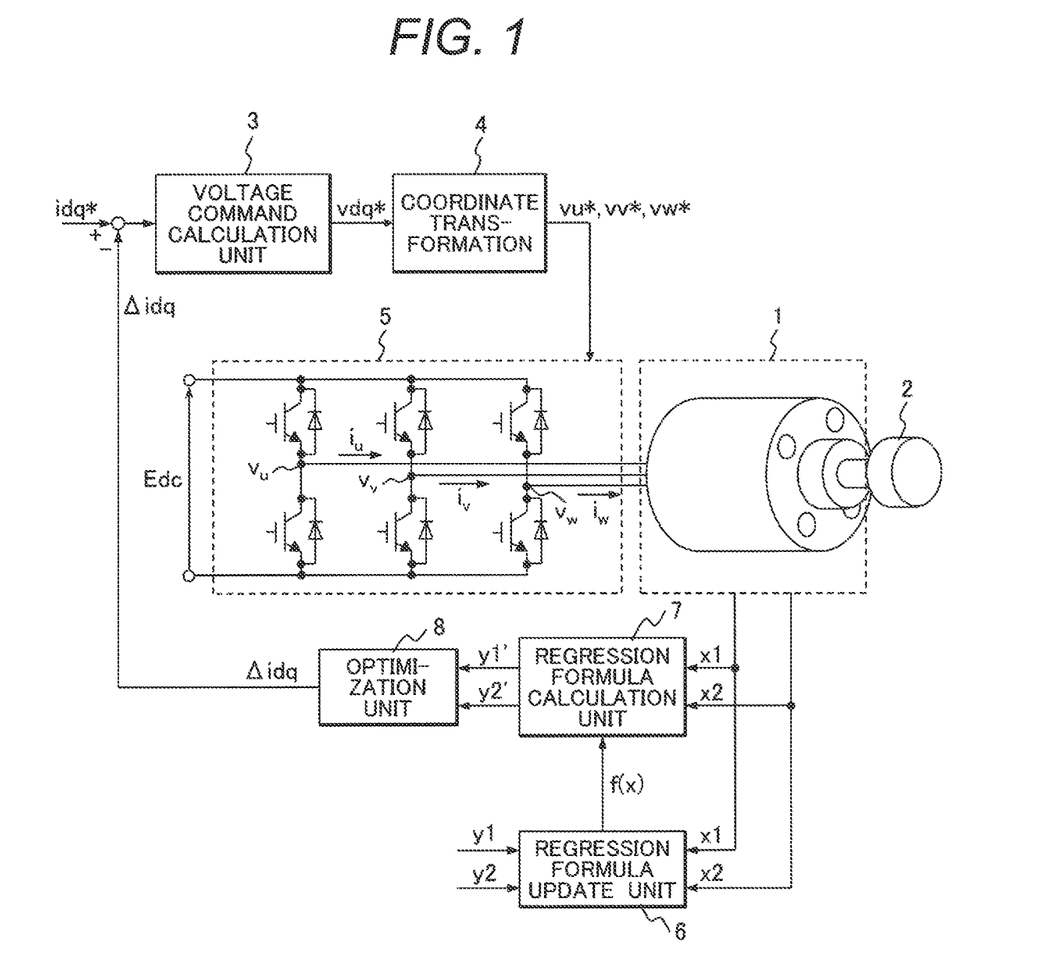
FIG. 1 is a configuration diagram of a motor control system according to a first embodiment of the present invention.

FIG. 1 is a configuration diagram of a motor control system according to the first embodiment of the present invention.

As shown in FIG. 1, an inverter 5 applies, to a motor 1, three-phase AC voltage (U-phase voltage Vu, V-phase voltage Vv, and W-phase voltage Vw). Accordingly, three-phase alternating current (U-phase current iu, V-phase current iv, and W-phase current iw) flows in the motor 1. As a result, the motor 1 generates motor torque (τ), and drives an object 2 to be driven which is a load on the motor 1.

Here, main state quantities of the motor 1 will be described with reference to FIG. 2.

Figure 2:
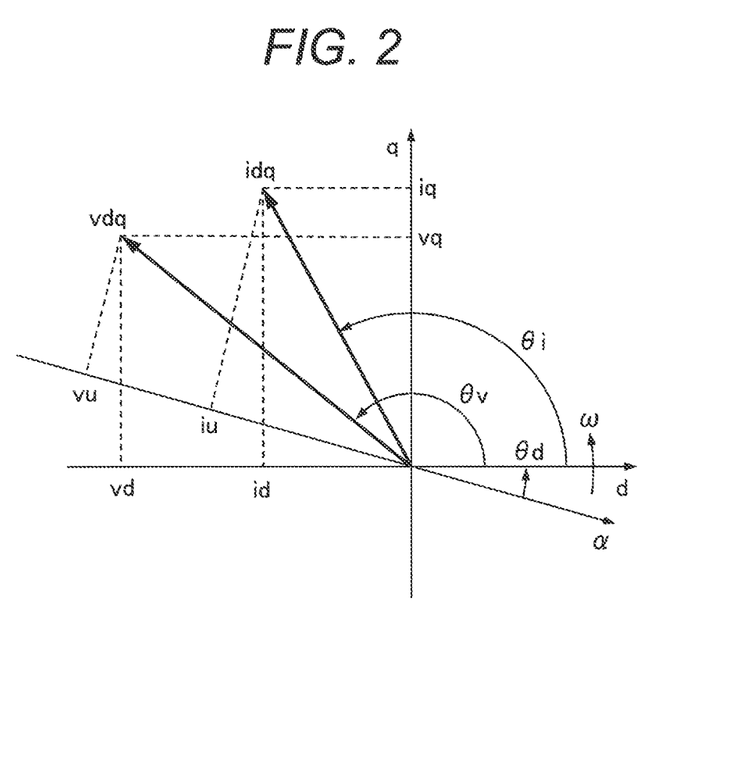
FIG. 2 is a vector diagram of voltage and current.

FIG. 2 is a vector diagram of voltage and current. Voltage, current, speed, and torque to be described below are the main state quantities of the motor 1.

As shown in FIG. 2, an α-axis indicates a direction of magnetic flux generated by a U-phase coil of the motor 1. A d-axis is an axis advanced by an electrical rotation angle θd from the α-axis (counterclockwise direction: advanced, and clockwise direction: retarded), and rotates in the counterclockwise direction at a rotational speed ω of the motor 1. A q-axis is an axis advanced by π/2 from the d-axis. A voltage vector vdq is a vector representing the amplitude and phase of the three-phase AC voltage, and its phase is advanced by a voltage phase θv with reference to the d-axis. An α-axis component, a d-axis component, and a q-axis component of the voltage vector vdq are the U-phase voltage vu, a d-axis voltage vd, and a q-axis voltage vq, respectively. A current vector idq is a vector representing the amplitude and phase of the three-phase alternating current, and its phase is advanced by a current phase θi with reference to the d-axis. In addition, an α-axis component, a d-axis component, and a q-axis component of the current vector idq are the U-phase current iu, a d-axis current id, and a q-axis current iq, respectively. In the case where the motor 1 is a permanent-magnet motor, motor torque (τ) represented by expression (1) is generated.

[Math 1]
$$\tau = \frac{3}{2}P_m(K_e + (L_d - L_q)i_d)i_q \quad (1)$$

In expression (1), Pm stands for the number of pole pairs, Ke stands for an induced voltage coefficient, Ld stands for d-axis inductance, and Lq stands for q-axis inductance.

Returning to FIG. 1, description of the system configuration will be continued below.

The object 2 to be driven is a system that uses the motor 1 as a driving source. Examples of the object 2 to be driven include a compressor, an elevator, and a winder. It should be noted that while the first embodiment involves a single motor as a driving source, a plurality of motors may be used.

A control unit includes a voltage command calculation unit 3 and a coordinate transformation 4. A feedback unit includes a regression formula update unit 6, a regression formula calculation unit 7, and an optimization unit 8. The feedback unit gives, to the control unit, a correction command (in the present embodiment, Δidq shown in FIG. 1) for changing a command value (vu*, vv*, vw*) of three-phase AC voltage.

The voltage command calculation unit 3 calculates a command value vdq* of the voltage vector vdq (hereinafter referred to as "voltage command value vdq*"), based on a difference between a command value idq* of the current vector idq (hereinafter referred to as "current command idq*"), as a control command, and a correction value Δidq of idq* (hereinafter referred to as "current correction value Δidq") as a correction command. For example, a voltage equation and PI control of the motor 1 are applied as means of calculating the voltage command value vdq* in the voltage command calculation unit 3. Incidentally, the correction value Δidq will be described below.

It should be noted that a control command is given by a higher-level control device. Furthermore, a control command is not limited to the current command, but may be, for example, a position command (third embodiment) or a torque command (fourth embodiment) as described below.

The coordinate transformation 4 transforms the voltage command vdq* to the command value of three-phase AC voltage (U-phase voltage command vu*, V-phase voltage command vv*, and W-phase voltage command vw*). For example, a two-phase to three-phase relative transformation is applied as means of transformation.

The inverter 5 outputs three-phase AC voltage based on the command value of three-phase AC voltage. For example, pulse width modulation (PWM: abbreviation of "pulse width modulation") is applied as means of converting the command value of three-phase AC voltage into three-phase AC voltage. It should be noted that the first embodiment employs, as the inverter 5, a publicly known two-level voltage type inverter that includes an insulated gate bipolar transistor (IGBT) as a main switching element as shown in FIG. 1. It should be noted that a semiconductor switching element such as a metal oxide semiconductor field effect transistor (MOSFET) may be applied instead of the IGBT.

The regression formula update unit 6 outputs regression formulas f(x), and sets them in the regression formula calculation unit 7 to be described below. The regression formulas f(x) include state quantities x1 and x2 of the motor as input variables, and evaluation values of the motor control system, that is, evaluation values y1 and y2 of the motor 1 or the object 2 to be driven as output variables. Here, the regression formula f(x) corresponds to a model in so-called regression analysis.

Examples of the state quantities of the motor 1 include current, voltage, speed, torque, magnetic flux, and temperature. One of them may be used. Alternatively, two or more of them may be used. In addition, examples of the evaluation values of the motor control system include power consumption of the motor 1, efficiency, vibration, and noise of the object 2 to be driven. Two of them may be used. Alternatively, two or more of them may be used. In the first embodiment, there are used two state quantities (x1, x2) and two evaluation values (y1, y2). It should be noted that the lower the evaluation values y1 and y2 are, the more desirable the motor control system is. Incidentally, the state quantities x1 and x2 may be estimate values, or may be values detected by sensors.

For example, when x1 is defined as current, x2 is defined as torque, y1 is defined as copper loss (proportional to power consumption), and y2 is defined as angular acceleration (proportional to vibration acceleration), expressions (2) and (3) hold as regression formulas.

[Math 2]

$$y_1 = f_1(x_1, x_2) = Rx_1^2 \quad (2)$$

[Math 3]

$$y_2 = f_2(x_1, x_2) = \frac{x_2}{J} \quad (3)$$

Here, R is a resistance value of the motor 1, and J is an inertia value of the object 2 to be driven.

Figure 3:
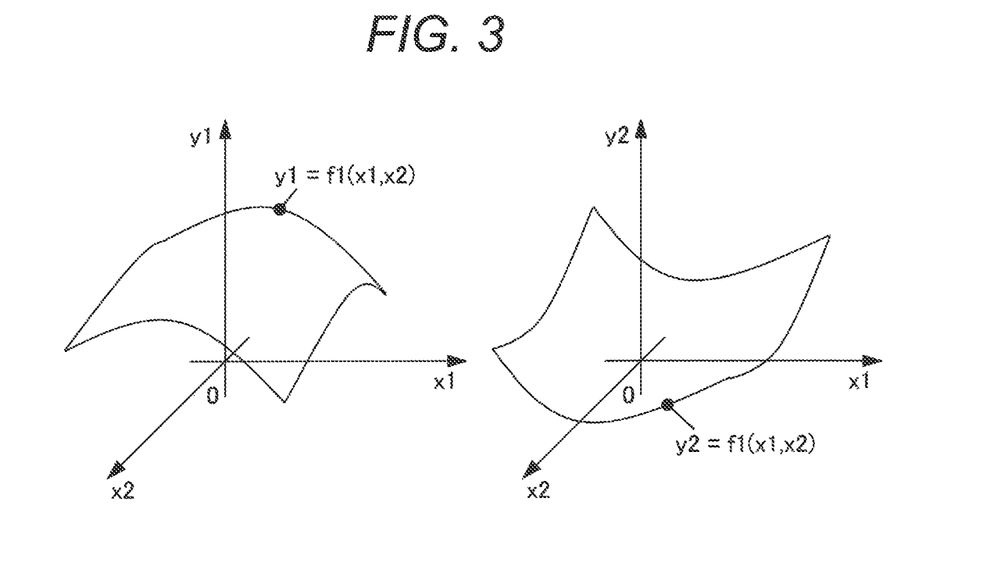
FIG. 3 shows an example of relationships between state quantities and regression formulas.

FIG. 3 shows an example of relationships between the state quantities x1 and x2 and the regression formulas f(x).

As shown in FIG. 3, in the first embodiment, two regression formulas "y1=f1(x1, x2)" and "y2=f2(x1, x2)" are defined. It should be noted that the regression formulas f1 and f2 are independent of each other in FIG. 3, but may be linearly dependent. Here, linear dependence refers to a case where the following equation holds for nonzero coefficients (a1 and a2 are coefficients):

$$a1 \cdot f1 + a2 \cdot f2 = 0$$

(in the case where this holds when a1=a2=0, f1 and f2 are independent).

The regression formula calculation unit 7 outputs estimate values y1' and y2' of the evaluation values y1 and y2 (hereinafter referred to as "estimated evaluation values y1' and y2'") based on the state quantities x1 and x2 and the regression formulas f(x)

The optimization unit 8 outputs the current command correction value Δidq, based on an evaluation function g(y') with the estimated evaluation values y1' and y2' as arguments. The current command correction value Δidq is negative feedback to the voltage command calculation unit 3 shown in FIG. 1. That is, the current command correction value Δidq is subtracted from the current command idq* shown in FIG. 1, and the current command is input to the voltage command calculation unit 3 after the subtraction.

A publicly known functional form based on so-called optimal control theory or optimization theory is used as the evaluation function g(y'). Therefore, when g(y') has a minimum value or maximum value, (y1', y2') is in an optimal state. The optimization unit 8 outputs the current command correction value Δidq in accordance with (y1', y2'). Then, the current command correction value Δidq for (y1', y2') in the case of g(y') having a minimum value or maximum value is considered the current command correction value Δidq for achieving the optimal state.

The current command correction value Δidq for (y1', y2') can be obtained by use of table data representing a relationship between them or by use of calculation or simulation using a model of a motor system.

It should be noted that in the first embodiment, an arithmetic processing unit such as a microcomputer executes a predetermined program to cause the voltage command calculation unit 3, the coordinate transformation 4, the regression formula update unit 6, the regression formula calculation unit 7, and the optimization unit 8 to function. Incidentally, it is not limited to a microcomputer, and various analog circuits and digital circuits may be used as appropriate.

Here, before describing operation and effects of the first embodiment, technical problems in the motor control system studied by the present inventors will be described.

First, there is a problem that it is difficult to accurately represent relationships between the state quantities x1 and x2 of the motor 1 and the evaluation values y1 and y2 of the motor control system. For example, assume that the state quantity x1 is an effective current value of the motor 1, and the evaluation value y1 is power consumption of the motor 1. Then, it is understood that there is a positive correlation between them. However, an accurate relational expression is different for each motor control system. This is because factors, such as a manufacturing error of the motor 1, characteristics of the object 2 to be driven, and switching delay of the inverter 5, are different for each system. Therefore, even if the effective current value of the motor 1 is reduced, it is difficult to estimate the amount of reduction in power consumption resulting therefrom. Performance of the motor control system is determined not by the state quantity of the motor 1 but by the evaluation value. Accordingly, difficulty in accurately estimating the evaluation value leads to a problem in performance evaluation.

In order to address such a problem, the evaluation values are estimated by use of regression formulas in the first embodiment.

Furthermore, when the evaluation values y1 and y2 of the motor control system are in a trade-off relationship, it is difficult to reduce both of them. Thus, optimization of their balance becomes a problem. For example, in the case where the object 2 to be driven is a compressor, the evaluation values y1 and y2 are in a trade-off relationship when the evaluation value y1 is defined as the power consumption of the motor 1 and the evaluation value y2 is defined as vibration/noise of the compressor. In addition, when the state quantity x1 is defined as the effective current value and the state quantity x2 is defined as a pulsation component of a rotor position, there is a positive correlation between them. Therefore, it is difficult to optimize a trade-off balance between the evaluation values y1 and y2 based on the state quantities x1 and x2. Furthermore, it is also conceivable that a limiter for the current command correction value Δidq is set as means of trade-off optimization. Such a means is based on the fact that there is a negative correlation between the current command correction value Δidq and the power consumption (evaluation value y1) of the motor 1. However, it is not always possible to perform optimization to achieve a desired balance by adjusting a limiter amount. As described above, it is possible to adjust the trade-off between the evaluation positions y1 and y2 to some extent. However, it is difficult to optimize a balance between them.

Meanwhile, in the first embodiment, the regression formula update unit 6, the regression formula calculation unit 7, and the optimization unit 8 constitute the feedback unit for optimizing the trade-off balance.

Next, described below are operation and effects of the regression formula update unit 6, the regression formula calculation unit 7, and the optimization unit 8 in the first embodiment.

The regression formula update unit 6 stores the regression formulas f(x) with the state quantities x1 and x2 as input variables and the evaluation values y1 and y2 as output variables. In addition, the regression formula update unit 6 outputs and sets f(x) in the regression formula calculation unit 7. As will be described below, since the evaluation values y1 and y2 are estimated by use of the regression formulas f(x), it is not necessary to provide means (for example, a sensor) for detecting the evaluation values y1 and y2 while the motor 1 is in operation. As a result, it is possible to achieve reduction in cost and size of the system.

The regression formula update unit 6 obtains and stores regression formulas f(x) based on detected values of the state quantities x1 and x2 and the evaluation values y1 and y2. Here, a publicly known means of regression analysis (for example, the least squares method) is applied. It should be noted that at the time of testing and maintenance conducted, for example, prior to product shipment of the motor control system, the regression formula update unit 6 obtains and stores regression formulas f(x) based on detected values of the state quantities x1 and x2 and the evaluation values y1 and y2, and performs update by replacing regression formulas already stored with the newly obtained regression formulas. It should be noted that the regression formula update unit 6 may update the regression formula in a predetermined update cycle while the motor control system is in operation.

Incidentally, either a linear model or a nonlinear model may be used in the regression formula, that is, regression analysis. In addition, the regression formula may include state quantities of any number which is equal to or greater than one.

The regression formula calculation unit 7 outputs the estimated evaluation values y1' and y2' based on the regression formulas f(x). As a result, it is possible to accurately estimate evaluation values which are different for each individual motor control system due to factors such as a manufacturing error of the motor 1, characteristics of the object 2 to be driven, and switching delay of the inverter 5.

The optimization unit 8 calculates the evaluation function g(y') with the estimated evaluation values y1' and y2' as arguments, and outputs the current command correction value Δidq based on a calculated value resulting from the evaluation function. As a result, a feedback system for optimizing the trade-off balance is constructed.

Figure 4:
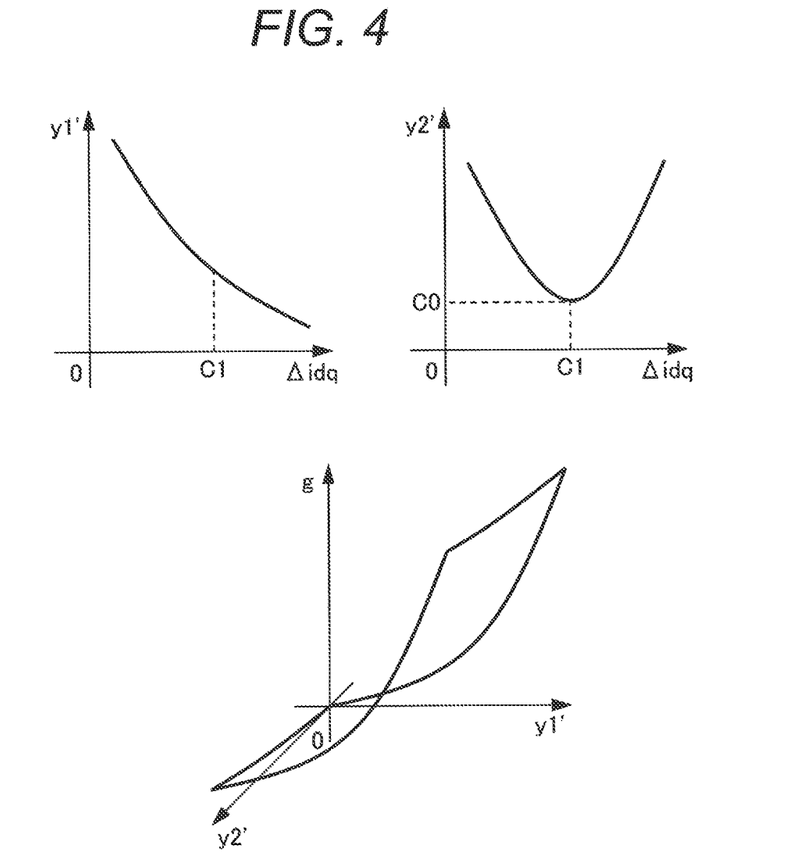
FIG. 4 shows an example of a relationship between an evaluation function and estimated evaluation values and relationships between the estimated evaluation values and a current command correction value.

FIG. 4 shows an example of a relationship between the evaluation function g(y') and the estimated evaluation values y1' and y2' and relationships between the estimated evaluation values y1' and y2' and the current command correction value Δidq.

As shown in FIG. 4, the estimated evaluation value y1' is inversely proportional to the current command correction value Δidq. The estimated evaluation value y2' has a local minimum point C0 when Δidq=C1. Furthermore, the evaluation function g(y') varies greatly with respect to the estimated evaluation value y1' rather than the estimated evaluation value y2'.

Figure 5:
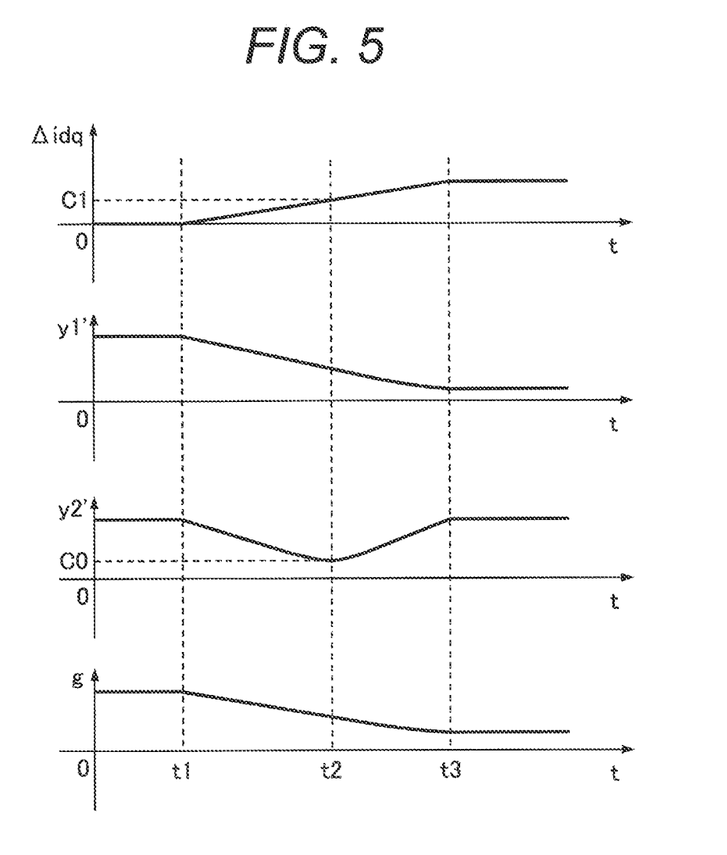
FIG. 5 shows operation waveforms of $\Delta idq$, $y1'$, $y2'$, and an evaluation function $g(y')$ shown in FIG. 4.

FIG. 5 shows operation waveforms of Δidq, y1', y2', and the evaluation function g(y') shown in FIG. 4. Here, an initial value of the current command correction value Δidq is zero, and the operation start time of the optimization unit 8 is t1.

As shown in FIG. 5, in a time period from the time t1 to t2, the current command correction value Δidq increases to C1, and both the estimated evaluation values y1' and y2' decrease. Therefore, the evaluation function g(y') also decreases. The current command correction value Δidq also increases in a time period from the time t2 to t3. Then, the estimated evaluation value y2' increases, while the estimated evaluation value y1' decreases. As a result, the evaluation function g(y') decreases accordingly. Then, at the time t3, the value of the evaluation function g(y') becomes saturated, and the current command correction value Δidq also becomes saturated. That is, since the evaluation function g(y') represents a minimum value, the estimated evaluation values y1' and y2' well-balanced in terms of the trade-off can be obtained by the current command correction value Δidq of this time.

According to the first embodiment as described above, there is constructed a feedback system capable of achieving an optimal balance between evaluation values based on accurate estimated evaluation values obtained by regression formulas. Therefore, it is possible to optimally control, with high accuracy, a balance between evaluation values in a trade-off relationship. Furthermore, with such a feedback system, it is possible to automatically perform optimal control according to each motor control system without adjusting complicated control parameters.

It should be noted that in the first embodiment, a display device may be provided for displaying the estimated evaluation values and the state quantities. Thus, a user of the motor control system can check the status of automatic optimization.

Moreover, the regression formula update unit 6 may be provided with a simulation model that includes state quantities of the motor 1 as input variables and evaluation values of the motor 1 or evaluation values of the object 2 to be driven as output variables, and may perform regression analysis to obtain regression formulas by using data of the simulation model. As a result, calculation time for obtaining a regression formula is reduced. It is thus possible to reduce the update cycle of the regression formula update unit 6.

Second Embodiment

Figure 6:
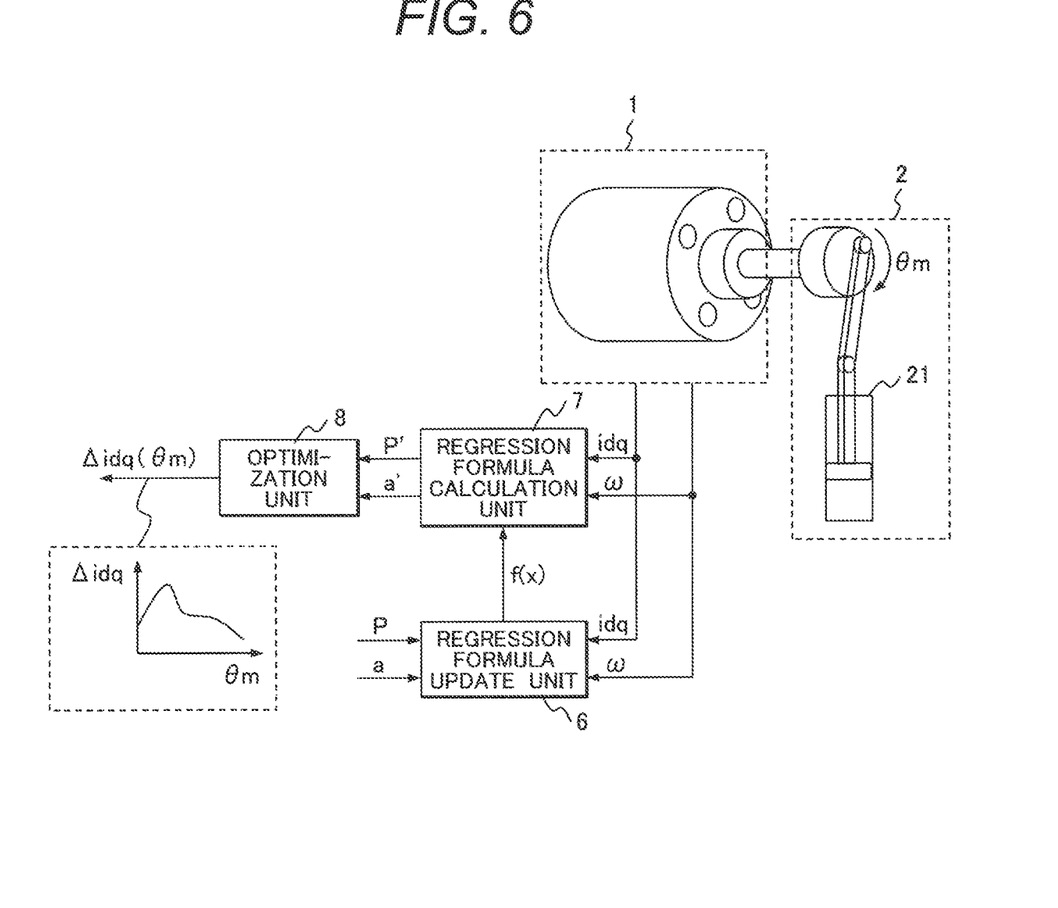
FIG. 6 is a configuration diagram of a motor control system according to a second embodiment of the present invention.

FIG. 6 is a configuration diagram of a motor control system according to the second embodiment of the present invention. Differences from the first embodiment will be mainly described below. It should be noted that although not shown, a voltage command calculation unit 3 and a coordinate transformation 4 are the same as those in the first embodiment.

In the second embodiment, an object 2 to be driven is a compressor that includes a cylinder 21. State quantities of a motor 1 (x1 and x2 in the first embodiment) are a current vector idq and a rotational speed ω. Evaluation values (y1 and y2 in the first embodiment) of the motor control system are power consumption P of the motor 1 and a vibrational amplitude value a of the cylinder 21. A current command correction value Δidq is generated in an optimization unit 8 by use of a numerical expression or table data with a mechanical rotation angle θm as an argument. It is desirable that both the power consumption P and the vibrational amplitude value a be reduced. However, there is a trade-off relationship between the power consumption P and the vibrational amplitude value a. A trade-off balance is automatically optimized by a feedback unit that includes a regression formula update unit 6, a regression formula calculation unit 7, and the optimization unit 8, as in the first embodiment.

When the object 2 to be driven is a compressor, a periodic fluctuation in compressor torque occurs according to the mechanical rotation angle θm of the motor 1. Therefore, mechanical vibration occurs in the cylinder 21. The vibrational amplitude value a of the mechanical vibration is related to a fast Fourier transformation (FFT) result of the rotational speed ω of the motor 1. Thus, the vibrational amplitude value a is estimated by use of a regression formula "a=f1(ω)". In addition, the power consumption P is related to the current vector idq of the motor 1. Thus, the power consumption P is estimated by use of a regression formula "P=f2(idq)".

The compressor torque periodically changes with respect to the mechanical rotation angle θm. In accordance therewith, an estimated vibrational amplitude value a' and estimated power consumption P' also periodically change. Therefore, the optimization unit 8 outputs the current command correction value Δidq that periodically changes with respect to the mechanical rotation angle θm so as to reduce the estimated vibrational amplitude value a' and the estimated power consumption P'.

Figure 7:
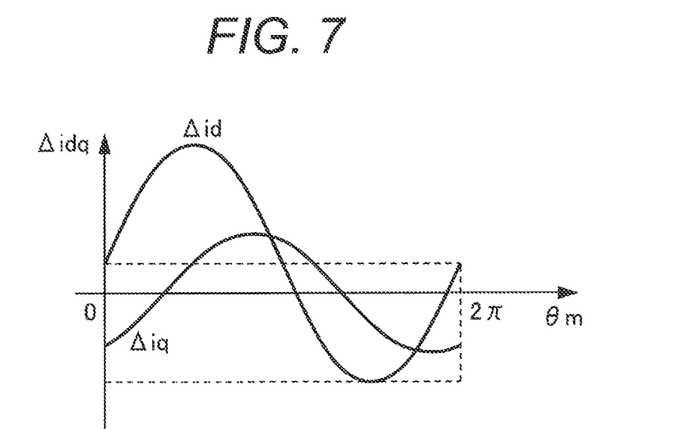
FIG. 7 shows waveform examples of a current correction value with respect to a mechanical rotation angle.

FIG. 7 shows waveform examples of the current correction value Δidq with respect to the mechanical rotation angle θm. The current command correction value Δidq is a resultant vector of a d-axis current correction value Δid and a q-axis current correction value Δiq. The values Δid and Δiq have periodicity in a range of "0≤θm≤2π". The optimization unit 8 sets a waveform of the current command correction value Δidq such that a trade-off balance between the estimated vibrational amplitude value a' and the estimated power consumption P' is optimized.

Figure 8:
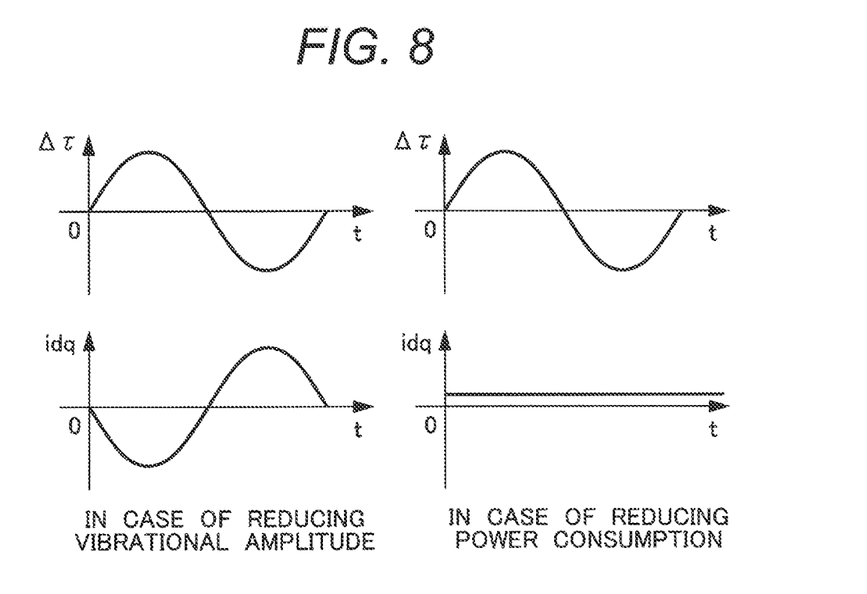
FIG. 8 shows waveform examples of torque pulsation of a compressor and a current vector.

FIG. 8 shows waveform examples of torque pulsation Δτ of the compressor and the current vector idq. In the case of reducing the vibrational amplitude value a, it is preferable to cause pulsation of the current vector idq to cancel the torque pulsation Δτ. Furthermore, in the case of reducing the power consumption P, it is preferable to maintain the current vector idq at a constant level. Accordingly, it is difficult to simultaneously reduce the vibrational amplitude value a and the power consumption P to zero by means of the current command correction value Δidq. Meanwhile, in the second embodiment, the current command correction value Δidq is generated in a manner to optimize the trade-off balance between the estimated vibrational amplitude value a' and the estimated power consumption P'.

Figure 9:
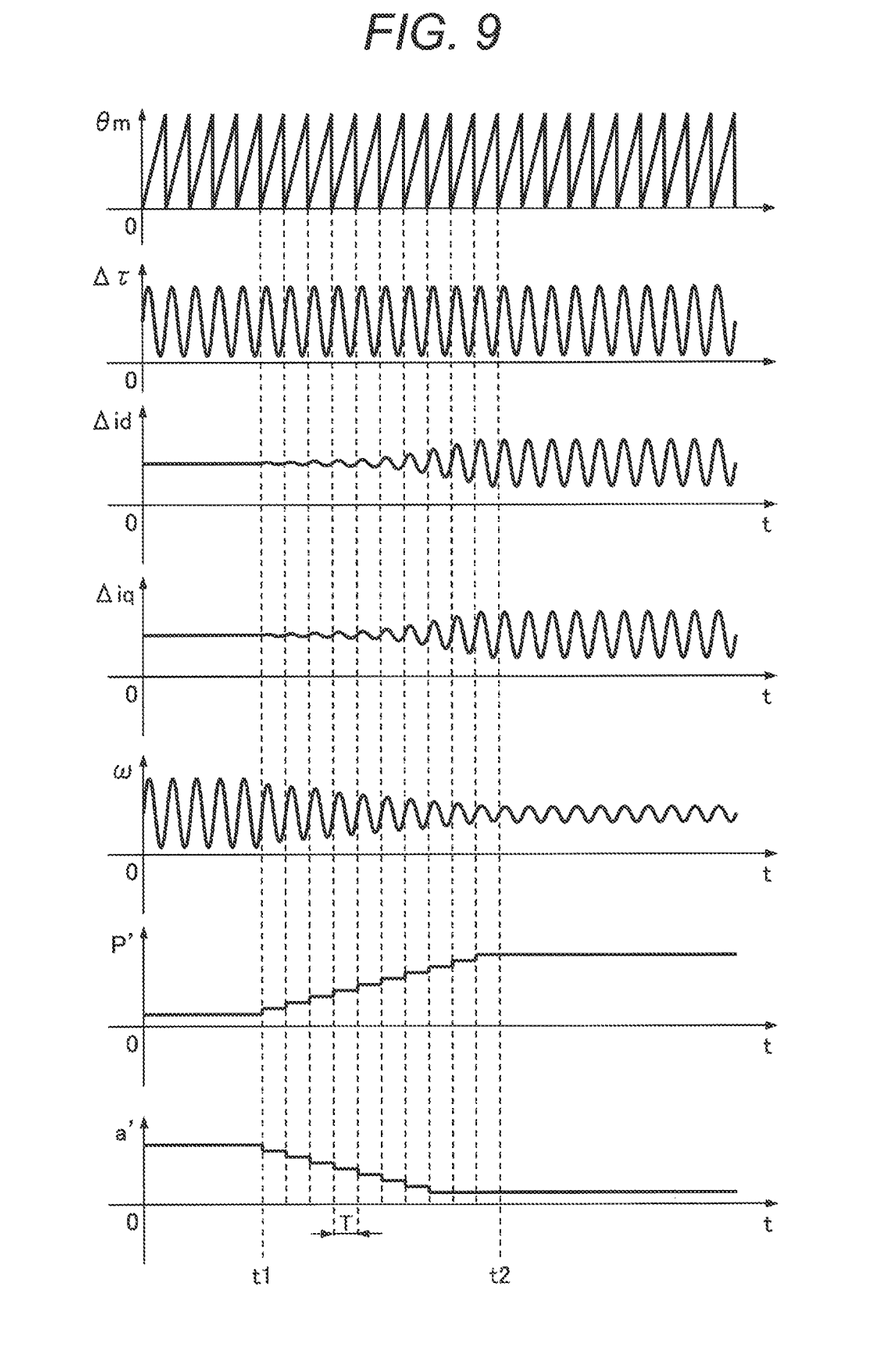
FIG. 9 shows operation waveform examples in the second embodiment.

FIG. 9 shows operation waveform examples in the second embodiment. Symbols t1, t2 and T stand for the calculation start time and calculation end time of the optimization unit 8, and a calculation period for generating a current correction value, respectively. After the time t1, the d-axis current correction value Δid and the q-axis current correction value Δiq periodically change. The amplitude of vibration gradually increases from the time t1, and becomes saturated at the time t2. At this time, the power consumption P increases, while the vibrational amplitude value a decreases. It should be noted that optimal allocation of the power consumption P and the vibrational amplitude value a after the time t2 depends on a specific functional form of an evaluation function g(P, a).

As shown in FIG. 9, in the present embodiment, the calculation period T of the optimization unit 8 is equal to a period of the torque pulsation Δτ of the compressor. Along with this, each waveform in FIG. 9 has the same periodicity as the torque pulsation Δτ of the compressor. As a result, it is possible to perform evaluation after sufficiently averaging effects of the d-axis current correction value Δid and the q-axis current correction value Δiq on the power consumption P and the vibrational amplitude value a, without increasing time required for optimization of the d-axis current correction value Δid and the q-axis current correction value Δiq. That is, it is possible to optimize a trade-off balance between a vibrational amplitude value and power consumption at high speed and with high accuracy.

Here, a comparative example will be cited for comparison with the present embodiment. The comparative example is a technique known from PTL 1 described above and others.

In the comparative example, a vibrational amplitude value (a) and power consumption (P) are assumed to be proportional to a pulsation component of a rotational speed (ω), and the pulsation component of the rotational speed (ω) is reduced so as to reduce the vibrational amplitude value and the power consumption. Therefore, the pulsation component of the rotational speed (ω) is extracted by FFT or the like, and a value obtained by multiplying the pulsation component by gain is fed back as a current command correction value Δidq. For example, after the time t1 shown in FIG. 9, the pulsation component of the rotational speed ω is extracted by FFT, and is set as the q-axis current correction value Δiq based thereon. Furthermore, in order to optimize a balance between reduction amounts of the vibrational amplitude value and the power consumption, a limiter is set for the current command correction value Δidq.

Meanwhile, in the second embodiment, the vibrational amplitude value (a) and the power consumption (P) are estimated by use of regression formulas. Therefore, as shown in FIG. 9, neither the estimated vibrational amplitude value nor power consumption (a' nor P') includes a pulsation component accompanying the torque pulsation Δτ. Accordingly, it is not necessary to extract a pulsation component by FFT or the like. However, unlike the comparative example, the optimization unit 8, as described above in the first and second embodiments, sets the current command correction value Δidq so as to generate the current command correction value Δidq. In the optimization unit 8, neither the vibrational amplitude value (a) nor the power consumption (P) includes a pulsation component. It is thus easy to perform calculation for optimization control. Furthermore, the so-called optimization control achieves optimization of the balance between reduction amounts of the vibrational amplitude value and the power consumption. Therefore, the optimization unit 8 can generate the current command correction value Δidq without using means requiring complicated adjustment, such as a limiter.

As described above, according to the second embodiment, there is constructed a feedback system capable of achieving an optimal balance between a vibrational amplitude value and power consumption based on accurate estimate values of the vibrational amplitude value and the power consumption obtained by regression formulas. Therefore, it is possible to optimally control the balance between the vibrational amplitude value and the power consumption in a trade-off relationship, with high accuracy. Furthermore, with such a feedback system, it is possible to automatically perform optimal control according to each motor control system without adjusting complicated control parameters.

Third Embodiment

Figure 10:
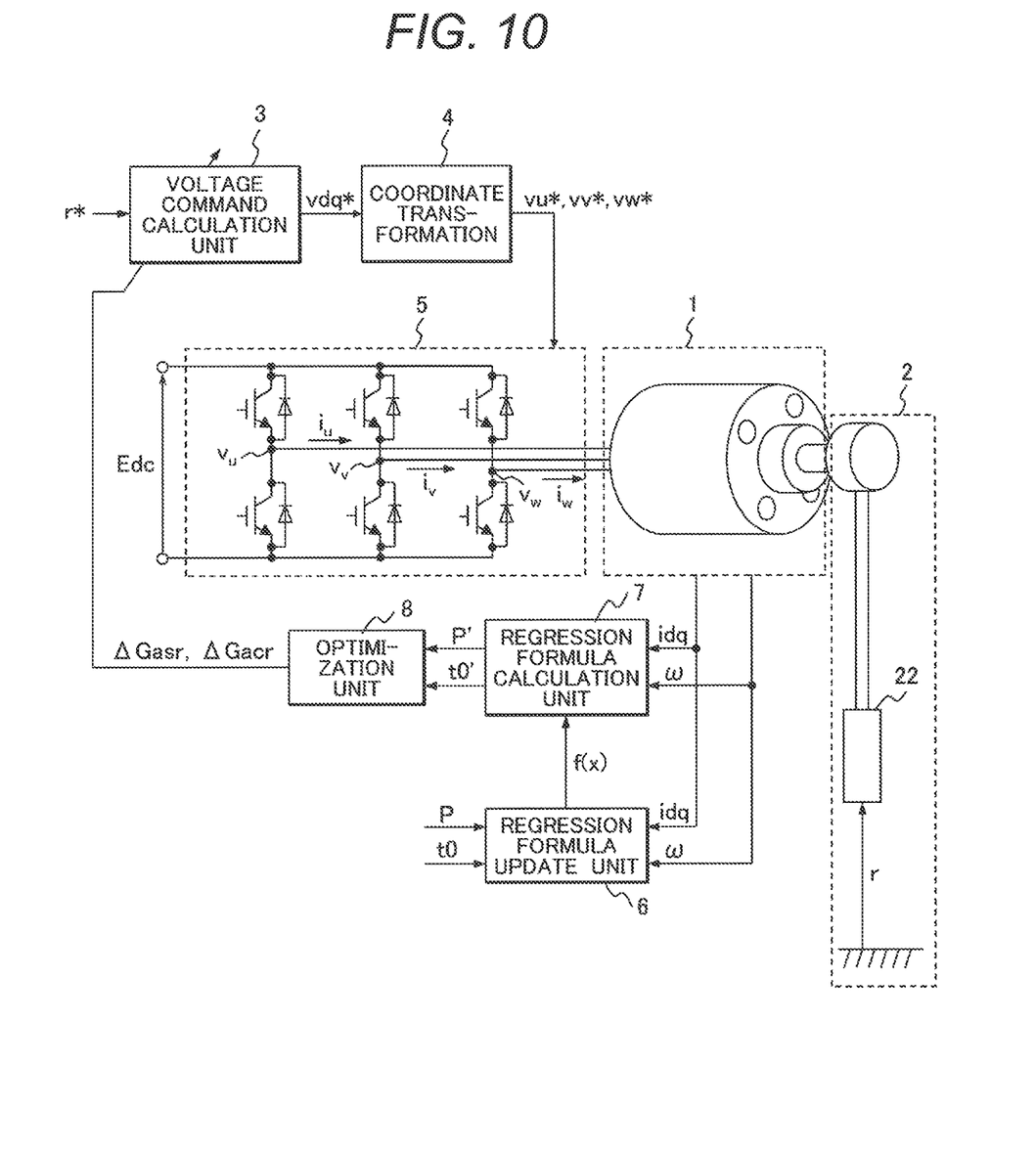
FIG. 10 is a configuration diagram of a motor control system according to a third embodiment of the present invention.

FIG. 10 is a configuration diagram of a motor control system according to the third embodiment of the present invention. Differences from the first and second embodiments will be mainly described below.

In the third embodiment, an object 2 to be driven is an elevator that includes a car 22. State quantities of a motor 1 (x1 and x2 in the first embodiment) are a current vector idq and a rotational speed ω as in the second embodiment. Evaluation values of the motor control system (y1 and y2 in the first embodiment) are power consumption P of the motor 1 and arrival time t0 of the car 22 (time from departure from a floor, at which the car has stopped, to arrival at a destination floor). It is desirable that both the power consumption P and the arrival time t0 be reduced. However, the power consumption P and the arrival time t0 are in a trade-off relationship with respect to responsiveness. For example, as responsiveness increases, the power consumption P of the motor 1 increases, while the arrival time t0 of the elevator decreases. Meanwhile, as in the first and second embodiments, a trade-off balance is automatically optimized by a feedback unit that includes a regression formula update unit 6, a regression formula calculation unit 7, and an optimization unit 8.

In the third embodiment, a voltage command calculation unit 3 generates a voltage command vdq* according to a position command r* such that a car position (height of the car 22 from a lowest floor) r coincides with r*. Furthermore, unlike the second embodiment, the optimization unit 8 generates and outputs a speed control gain correction value ΔGasr or a current control gain correction value ΔGacr for the voltage command calculation unit 3, based on estimate values (P', t0') of the power consumption P and the arrival time t0 estimated by regression formulas, so as to optimize a trade-off balance between the power consumption P and the arrival time t0 with respect to responsiveness.

It should be noted that the speed control gain correction value ΔGasr or the current control gain correction value ΔGacr is generated by use of a numerical expression or table data with the car position r as an argument. For example, when the position r is low, each gain is increased so as to prevent the car 22 from falling due to lack of driving force. Meanwhile, when the position r is high, each gain is reduced so as to improve ride quality inside the car 22.

According to the third embodiment, there is constructed a feedback system capable of achieving an optimal balance between power consumption and arrival time based on accurate estimate values of the power consumption and the arrival time obtained by regression formulas. Therefore, it is possible to optimally control the balance between the power consumption and the arrival time in a trade-off relationship, with high accuracy. Furthermore, with such a feedback system, it is possible to automatically perform optimal control according to each motor control system without adjusting complicated control parameters.

Fourth Embodiment

Figure 11:
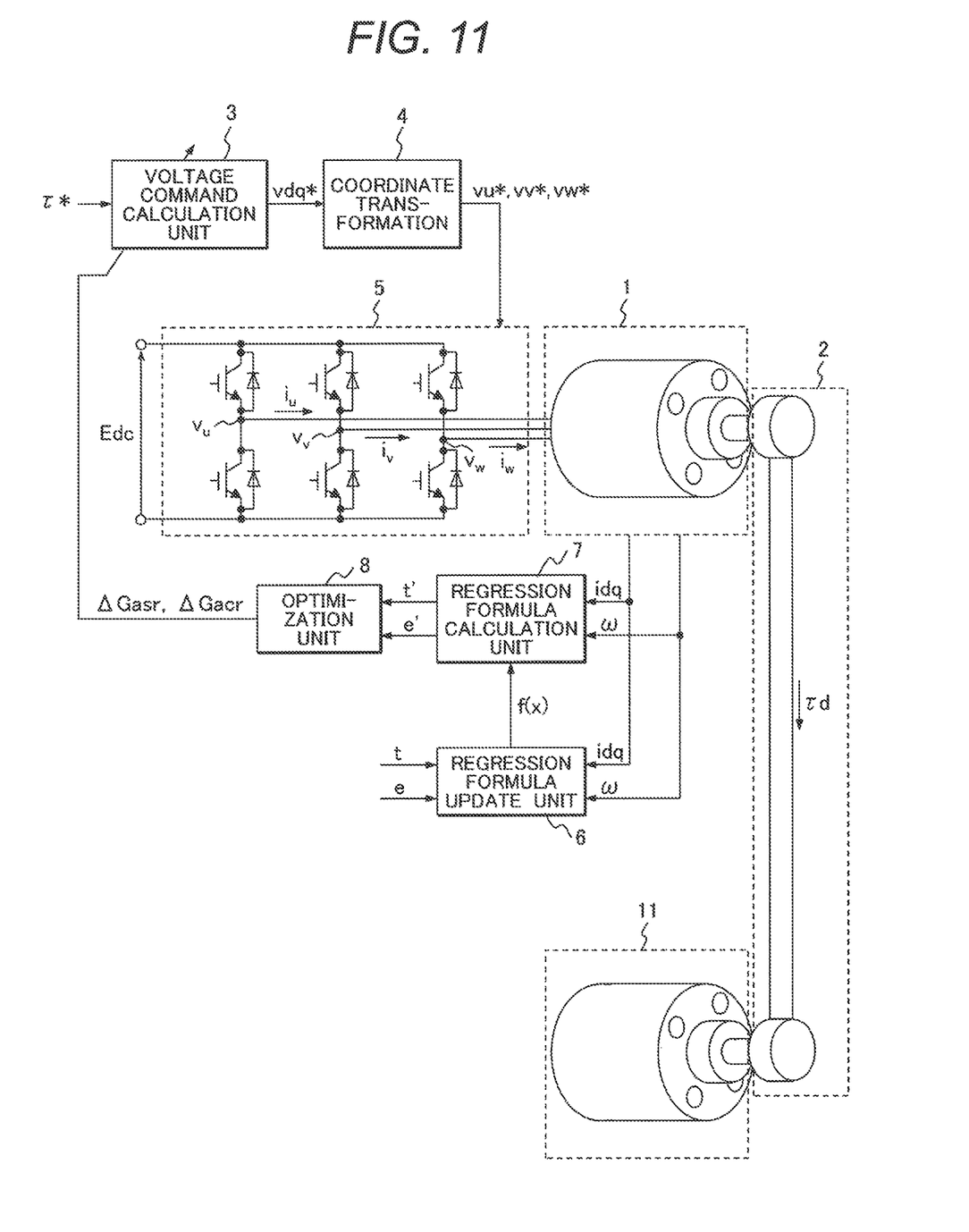
FIG. 11 is a configuration diagram of a motor control system according to a fourth embodiment of the present invention.

FIG. 11 is a configuration diagram of a motor control system according to the fourth embodiment of the present invention. Differences from the first to third embodiments will be mainly described below.

In the fourth embodiment, an object 2 to be driven is a winder. The winder winds an object 23 to be wound, such as a metal plate and a copper wire, under tension τd. Here, the tension τd is the product of torque τ of a motor 1 and a radius d of a rotation axis. The motor 1 drives a winding unit. It should be noted that an unwinding unit 11 may be provided with a motor.

In the fourth embodiment, state quantities (x1 and x2 in the first embodiment) of the motor 1 are a current vector idq and a rotational speed ω as in the second and third embodiments. Evaluation values (y1 and y2 in the first embodiment) of the motor control system are operation time t of the object 2 to be driven and a defect generation rate e of the object 23 to be wound. It is desirable that both the operation time t and the defect generation rate e be reduced. However, the operation time t and the defect generation rate e are in a trade-off relationship with respect to responsiveness. For example, as responsiveness increases, the operation time t decreases, while the defect generation rate e increases. Meanwhile, as in the first to third embodiments, a trade-off balance is automatically optimized by a feedback unit that includes a regression formula update unit 6, a regression formula calculation unit 7, and an optimization unit 8.

In the fourth embodiment, a voltage command calculation unit 3 generates a voltage command vdq* according to a torque command τ* for obtaining desired tension such that the tension τd coincides with "τ*×d." Furthermore, unlike the first to third embodiments, the optimization unit 8 generates and outputs a speed control gain correction value ΔGasr or a current control gain correction value ΔGacr for the voltage command calculation unit 3, based on estimate values (t', e') of the operation time t and the defect generation rate e estimated by regression formulas, so as to optimize a trade-off balance between the operation time t and the defect generation rate e with respect to responsiveness.

It should be noted that the speed control gain correction value ΔGasr or the current control gain correction value ΔGacr is generated by use of a numerical expression or table data with the torque τ of the motor 1 as an argument.

The speed control gain correction value ΔGasr and the current control gain correction value ΔGacr may be generated by use of a numerical expression or table data with material characteristics of the object 23 to be wound, a remaining amount of winding, and the like in addition to the torque τ, as arguments. For example, in the case of the object 23 to be wound having high rigidity, it is possible to reduce the operation time t by increasing control gain. Furthermore, when the remaining amount of winding has decreased, it is possible to mitigate shock after completion of winding by reducing control gain.

According to the fourth embodiment, there is constructed a feedback system capable of achieving an optimal balance between the operation time t and the defect generation rate e, based on accurate estimate values of the operation time and the defect generation rate obtained by regression formulas. Therefore, it is possible to optimally control the balance between the operation time t and the defect generation rate e in a trade-off relationship, with high accuracy. Furthermore, with such a feedback system, it is possible to automatically perform optimal control according to each motor control system without adjusting complicated control parameters.

It should be noted that the present invention is not limited to the above-described embodiments, but includes various variations. For example, the above embodiments have been described in detail so as to clearly describe the present invention, and are not necessarily limited to those having all the configurations described. Furthermore, it is also possible to add another configuration to a part of the configuration of each embodiment, delete a part of the configuration of each embodiment, and replace a part of the configuration of each embodiment with another configuration.

REFERENCE SIGNS LIST 1 motor
2 object to be driven
3 voltage command calculation unit
4 coordinate transformation
5 inverter
6 regression formula update unit
7 regression formula calculation unit
8 optimization unit
11 unwinding unit
21 cylinder
22 car
23 object to be wound

The invention claimed is:

1. A motor control system comprising:
an inverter that applies AC voltage to a motor;
a control unit that generates a voltage command for the AC voltage in response to a control command; and
a feedback unit that gives, to the control unit, a correction command for changing the voltage command,
wherein the feedback unit:
estimates a plurality of evaluation values of the motor or an object to be driven by the motor from at least one state quantity of the motor by using a plurality of regression formulas, in which the state quantity is an input variable and the plurality of evaluation values are output variables;
calculates an evaluation function with the estimated plurality of evaluation values as arguments; and generates the correction command based on a calculation value resulting from the evaluation function.

2. The motor control system according to claim 1, wherein the plurality of evaluation values is in a trade-off relationship.

3. The motor control system according to claim 1, wherein the feedback unit includes a regression formula update unit that obtains the plurality of regression formulas.

4. The motor control system according to claim 1, further comprising:
a display device that displays the state quantity and the plurality of evaluation values.

5. The motor control system according to claim 3, wherein the regression formula update unit performs regression analysis by using a simulation model with the state quantity as an input variable and the plurality of evaluation values as output variables, to obtain the regression formulas.

6. The motor control system according to claim 1, wherein the object to be driven is a compressor,
the state quantities are current and rotational speed of the motor,
the plurality of evaluation values are power consumption of the motor and vibrational amplitude of the compressor,
the control command is a motor current command, and
the correction command is a correction command for the motor current command.

7. The motor control system according to claim 6, wherein the correction command for the motor current command is generated by use of a numerical expression or a table with a rotation angle of the motor as an argument.

8. The motor control system according to claim 6, wherein the correction command for the motor current command periodically changes with respect to a rotation angle of the motor.

9. The motor control system according to claim 8, wherein a calculation period for generating the correction command for the motor current command is equal to a period of torque pulsation of the compressor.

10. The motor control system according to claim 1, wherein
the object to be driven is an elevator that includes a car,
the state quantities are current and rotational speed of the motor,
the plurality of evaluation values are power consumption of the motor and arrival time for the car to arrive at a destination floor,
the control command is a position command for the car, and
the correction command is a correction command for gain in the control unit.

11. The motor control system according to claim 10, wherein
the correction command for the gain is generated by use of a numerical expression or a table with a position of the car as an argument.

12. The motor control system according to claim 1, wherein
the object to be driven is a winder,
the state quantities are current and rotational speed of the motor,
the plurality of evaluation values are operation time of the winder and a defect generation rate of an object to be wound,
the control command is a torque command for the motor, and
the correction command is a correction command for gain in the control unit.

13. The motor control system according to claim 12, wherein
the correction command for the gain is generated by use of a numerical expression or a table with torque of the motor as an argument.

14. A motor control method for applying AC voltage to a motor in response to a voltage command, comprising:
estimating a plurality of evaluation values of the motor or an object to be driven by the motor from at least one state quantity of the motor by using a plurality of regression formulas, in which the state quantity is an input variable and the plurality of evaluation values are output variables;
calculating an evaluation function with the estimated plurality of evaluation values as arguments; and
changing the voltage command based on a calculation value resulting from the evaluation function.

* * * * *